US012617170B2

(12) United States Patent　　　(10) Patent No.:　US 12,617,170 B2

Iglesias Cano et al.　　　　　　　(45) Date of Patent:　　May 5, 2026

(54) METHOD FOR MANUFACTURING A BLADE FOR AN AIRCRAFT TURBINE ENGINE

(71) Applicant: SAFRAN AIRCRAFT ENGINES, Paris (FR)

(72) Inventors: Célia Iglesias Cano, Moissy-Cramayel (FR); Dominique Michel Serge Magnaudeix, Moissy-Cramayel (FR); Lucas Antoine Christophe Lauwick, Moissy-Cramayel (FR); Maxime Marie Désiré Blaise, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 223 days.

(21) Appl. No.: 18/698,111

(22) PCT Filed: Sep. 27, 2022

(86) PCT No.: PCT/FR2022/051820

§ 371 (c)(1),
(2) Date: Apr. 3, 2024

(87) PCT Pub. No.: WO2023/057703

PCT Pub. Date: Apr. 13, 2023

(65) Prior Publication Data

US 2024/0399694 A1　　Dec. 5, 2024

(30) Foreign Application Priority Data

Oct. 5, 2021　(FR) ........................................ 2110523

(51) Int. Cl.
*B29D 99/00*　　　(2010.01)
*B29C 33/12*　　　(2006.01)
(Continued)

(52) U.S. Cl.
CPC ........ *B29D 99/0025* (2013.01); *B29C 33/126* (2013.01); *B29C 45/14065* (2013.01);
(Continued)

(58) Field of Classification Search
CPC ............. B29D 99/0025; B29L 2031/08; B29C 33/126; B29C 45/14065;
(Continued)

(56) References Cited

U.S. PATENT DOCUMENTS 2,256,769 A　*　9/1941　Amrine ................... B29C 43/18
16/431
2008/0104837 A1*　5/2008　Ikeda ................... F04D 29/2227
29/889

(Continued)

FOREIGN PATENT DOCUMENTS

FR　　3 008 920 A1　　1/2015
FR　　3 059 268 A1　　6/2018

OTHER PUBLICATIONS

International Search Report mailed Jan. 18, 2023, issued in corresponding International Application No. PCT/FR2022/051820, filed Sep. 27, 2022, 5 pages.

(Continued)

*Primary Examiner* — John J DeRusso
(74) *Attorney, Agent, or Firm* — CHRISTENSEN O'CONNOR JOHNSON KINDNESS PLLC

(57)　　　　　ABSTRACT

A method for producing a blade includes providing a fibrous preform; providing a metal foil of elongate shape and including at least one indexing recess; and providing an injection mold having at least an upper part and a lower part. At least one of the upper part and the lower part includes at least one positioning projection. The method further includes the steps of arranging the fibrous preform in the injection mold; coating the leading edge of the fibrous
(Continued)

preform with the metal foil, and inserting the positioning projection into the indexing recess so as to hold the metal foil in position on the leading edge. The method also further includes injecting a resin into the injection mold.

10 Claims, 6 Drawing Sheets

(51) Int. Cl.

| | |
|---|---|
| *B29C 45/14* | (2006.01) |
| *B29C 70/48* | (2006.01) |
| *B29C 70/54* | (2006.01) |
| *B29C 70/78* | (2006.01) |
| *B29C 70/86* | (2006.01) |
| *B29L 31/08* | (2006.01) |

(52) U.S. Cl.
CPC ............ *B29C 70/48* (2013.01); *B29C 70/541* (2013.01); *B29C 70/545* (2013.01); *B29C 70/78* (2013.01); *B29C 70/86* (2013.01); *B29C 2045/14122* (2013.01); *B29C 2045/14131* (2013.01); *B29C 2793/009* (2013.01); *B29L 2031/08* (2013.01)

(58) Field of Classification Search
CPC ........... B29C 2045/14122; B29C 2045/14131; B29C 70/541; B29C 70/86
See application file for complete search history.

(56) References Cited

U.S. PATENT DOCUMENTS

| | | | |
|---|---|---|---|
| 2016/0101575 A1* | 4/2016 | Ashtari | .................. B29C 70/48 425/129.1 |
| 2016/0167269 A1* | 6/2016 | Pautard | ............. B29C 45/14008 264/259 |
| 2018/0147797 A1 | 5/2018 | Chassignet | |

OTHER PUBLICATIONS

Written Opinion mailed Jan. 18, 2023, issued in corresponding International Application No. PCT/FR2022/051820, filed Sep. 27, 2022, 5 pages.

* cited by examiner

METHOD FOR MANUFACTURING A BLADE FOR AN AIRCRAFT TURBINE ENGINE

TECHNICAL FIELD OF THE INVENTION

The invention relates to the technical field of methods for manufacturing vanes for the aircraft turbine engines. More specifically, the invention relates to the manufacturing methods for manufacturing composite material vanes, which can be rotating or stationary, for example.

TECHNICAL BACKGROUND

It is well known that an aircraft turbine engine comprises a fan allowing to suck in an air flow divided into a primary flow and a secondary flow. The primary flow passes through the engine of the turbine engine, while the secondary flow is directed towards a secondary vein.

The primary flow is compressed in, for example, a low-pressure compressor and then a high-pressure compressor of the engine. The compressed air is then mixed with a fuel and burnt within an annular combustion chamber arranged downstream of the series of compressors. The gases formed by the combustion pass through a high-pressure turbine and a low-pressure turbine located downstream of the combustion chamber, which allow to drive the rotors of the compressors. Finally, the gases escape through a nozzle, the cross-section of which allows these gases to be accelerated to generate the propulsion.

The elements of the turbine engine such as the fan, the compressors or the turbines comprise vanes that allow to exert an action on the air flow. For example, the compressor vanes are used to compress the primary air flow.

A vane typically comprises an aerodynamically shaped blade comprising a pressure side face and a suction side face connected to the pressure side face by a leading edge and a trailing edge. To reduce the weight of the vane, the blade is formed from a composite material comprising reinforcing fibres embedded in a polymer matrix. To protect the vane from damage caused by the impact of foreign bodies, the leading edge is coated with a metallic foil. The attachment of the metal foil to the leading edge presents a number of challenges.

A method for manufacturing the vane involves supplying a fibrous preform and then impregnating the preform during a resin injection step, followed by the polymerisation of the resin. In a subsequent step, the metal foil is attached to the leading edge of the vane by gluing. The glue is polymerised in an oven. The time taken to manufacture the vane using such a manufacturing method is long because the impregnation step must be completed to attach the metal foil to the leading edge.

In order to reduce the manufacturing time, the document FR-A1-3008920 recommends attaching the metal foil to the leading edge during the impregnation step. This document teaches that the mould can be equipped with a system for positioning and holding the foil. However, this system is not entirely satisfactory. This is because the foil is attached in position in the mould, but the relative position of the foil to the vane cannot be accurately determined. It's difficult to position the vane in relation to the foil once it's in the mould. Also, the metal foil may be displaced during the mould closing and/or the injection in the absence of a suitable positioning and holding system. As a result of the manufacturing method, a radial and/or axial offset of the metal foil relative to the leading edge can be observed. This incorrect positioning leads to non-conformity of the vane. There is therefore a need to provide a manufacturing method that allows to reduce the defects in the positioning of the metal foil on the leading edge.

SUMMARY OF THE INVENTION

To this end, the invention proposes a method for manufacturing a vane comprising a blade for an aircraft turbine engine comprising the following steps:
- (100) providing a fibrous preform of the blade, the fibrous preform comprising a leading edge, a trailing edge, a pressure side face connected to a suction side face by the leading edge and the trailing edge,
- (200) providing an elongate metal foil comprising at least one indexing recess,
- (300) providing an injection mould comprising at least upper and lower parts intended to cooperate together to define an internal volume and each defining an pattern of the vane, and at least one of these upper and lower parts comprising at least one projecting positioning element,
- (400) arranging the fibrous preform in the injection mould,
- (500) coating the leading edge of the fibrous preform with the metal foil, and inserting the projecting positioning element into the indexing recess so as to hold the metal foil in position on the leading edge,
- (600) injecting a resin into the injection mould in order to impregnate the fibrous preform and attach the metal foil to the leading edge.

According to the invention, the metal foil is placed on the leading edge of the preform which is arranged in the injection mould in order to simultaneously impregnate the fibrous preform and attach the metal foil to the leading edge. This allows to reduce the vane manufacturing times.

In addition, according to the invention, the metal foil has at least one indexing recess and the mould comprises at least one projecting positioning element for positioning on the upper and/or lower part. When the fibrous preform is inserted into the mould, the projecting positioning element is inserted into the indexing recess, allowing the metal foil to be attached in position on the leading edge during the material injection operation. This allows to reduce the risks of the metal foil moving away from the leading edge during the injection of the resin.

As a result, the risks of supplying non-conforming vanes are reduced.

The invention may comprise one or more of the following characteristics, taken alone or in combination with each other:
- the projecting positioning element is a nipple provided on an inner surface of the upper part or of the lower part;
- the nipple is cylindrical or conical in shape;
- the nipple has a threaded external surface;
- the metal foil comprises a first lateral fin and a second lateral fin connected to the first lateral fin by a central portion, the indexing recess being provided on the first or the second lateral fin;
- in step (200), the metal foil comprises a central part and an excess part arranged on either side of the central part, the indexing recess being located on one or each of the excess parts;
- the indexing recess is an orifice or a notch;
- the metal foil comprises two indexing recesses respectively comprising a first orifice and a second orifice opposite the first orifice and in that the upper or lower part comprises a first projecting positioning element intended to cooperate with the first orifice and a second projecting positioning element intended to cooperate with the second orifice;

the fibrous preform comprises an additional indexing recess;

the method comprises the following step after step (600):

(700) machining the vane so as to remove the indexing recess.

The invention also relates to an injection mould for implementing the manufacturing method according to any of the preceding characteristics, comprising:

at least lower and upper parts, each presenting an pattern of the vane and intended to cooperate together to define an internal volume for receiving the fibrous preform and the metal foil, at least one of these upper and lower parts comprising at least one projecting positioning element intended to cooperate with the indexing recess of the metal foil so as to hold the metal foil in position on the leading edge.

BRIEF DESCRIPTION OF THE FIGURES

Further characteristics and advantages will be apparent from the following description of a non-limiting embodiment of the invention with reference to the appended drawings in which.

DETAILED DESCRIPTION OF THE INVENTION

Figure 1:
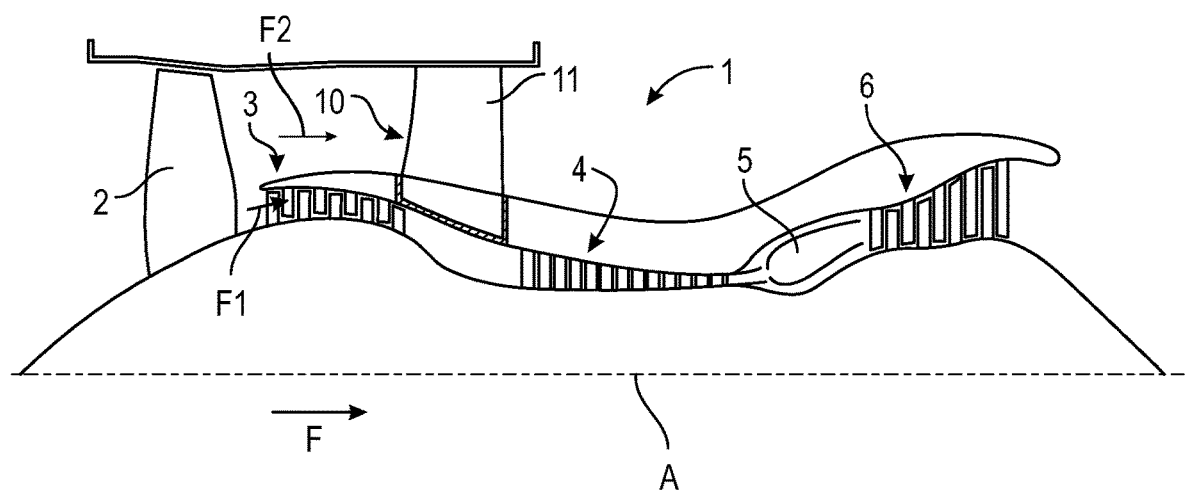
FIG. 1 is a schematic representation of an aircraft half-turbine engine in longitudinal cross-section.

An aircraft turbine engine 1 is shown in FIG. 1, for example.

The turbine engine 1 extends along a longitudinal axis A. It comprises, from upstream to downstream in the direction of the gas flow F along the longitudinal axis A, a fan 2, at least one compressor such as a low-pressure compressor 3 and a high-pressure compressor 4, a combustion chamber 5, at least one turbine 6 such as a high-pressure turbine and a low-pressure turbine, and a nozzle (not shown).

The rotor of the low-pressure turbine is connected to the fan 2 and to the rotor of the low-pressure compressor 3 by a low-pressure shaft (not shown). The rotor of the high-pressure turbine is connected to the rotor of the high-pressure compressor 4 by a high-pressure shaft (not shown).

The turbine engine 1 also comprises a stator vane 10. The stator vane allows to rectify the flow at the outlet of an upstream rotor so as to provide a maximum thrust at the outlet of the turbine engine 1. In the particular example shown in FIG. 1, the stator vane 10 is located downstream of the fan 2 and allows to rectify the secondary flow F2. The stator vane 10 is arranged between the low-pressure compressor 3 and the high-pressure compressor 4, for example.

The fan 2 allows the suction of an air flow dividing into a primary flow F1 and a secondary flow F2. The primary flow F1 passes through the engine of the turbine engine 1, while the secondary flow F2 is directed towards a secondary vein surrounding the primary vein.

The primary flow F1 is compressed in the low-pressure compressor 3 and then in the high-pressure compressor 4. The compressed air is then mixed with a fuel and burned within the combustion chamber 5. The gases formed by combustion pass through the high-pressure turbine and the low-pressure turbine. The gases escape finally through the nozzle whose cross-section allows the acceleration of these gases to generate the propulsion. The secondary flow F2 passes through the stator vane 10, which accelerates the circulation speed of the secondary flow F2 to generate the propulsion.

Figure 2:
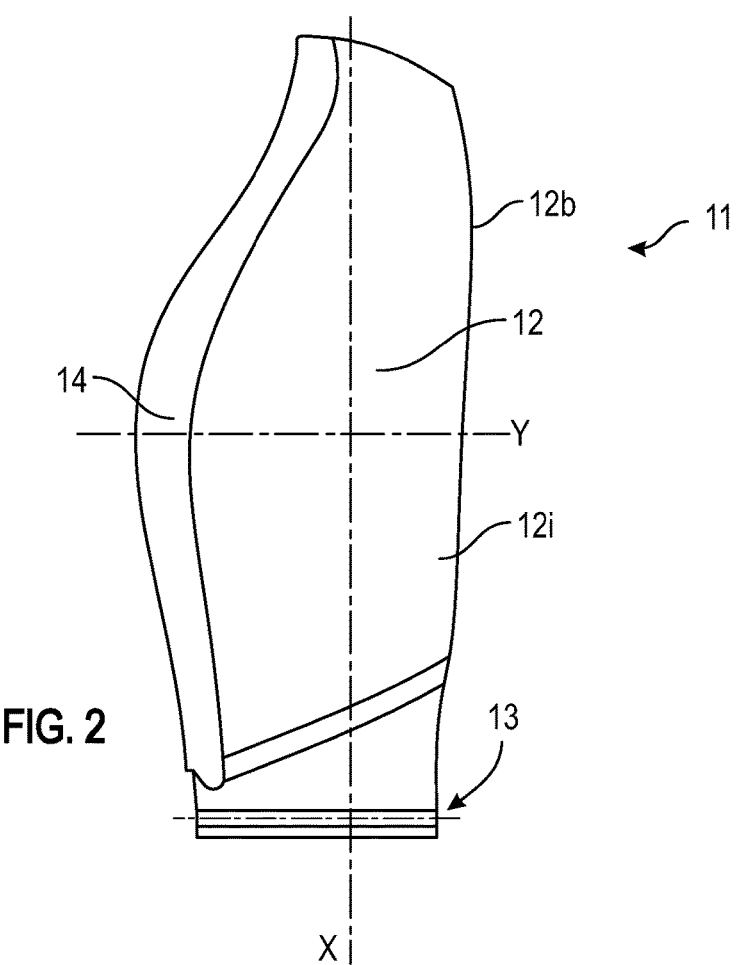
FIG. 2 is a schematic perspective view of a vane in a first embodiment.
Figure 3:
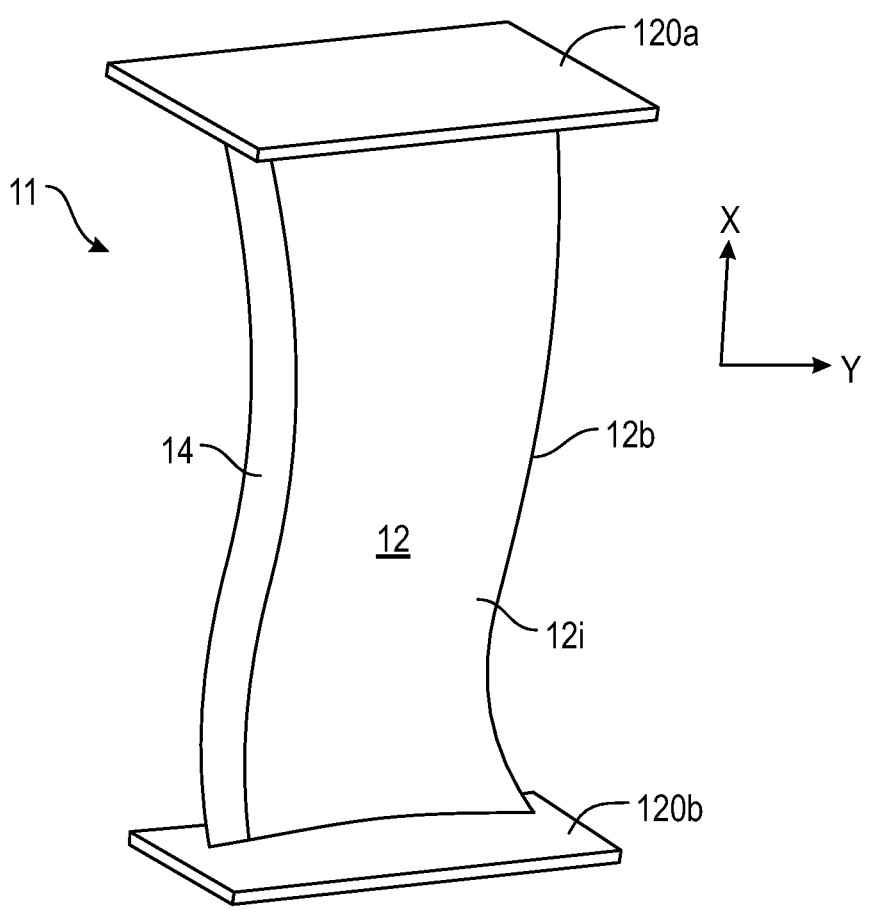
FIG. 3 is a schematic perspective view of a vane in a second embodiment.

The fan 2, the compressor, the turbine and the stator vane 10 are equipped with an assembly of vanes 11. The vanes 11 are mobile or stationary in rotation about the longitudinal axis A. The vanes 11 extend radially with respect to the longitudinal axis A. With reference to FIGS. 2 and 3, each vane 11 comprises a blade 12 and a metal foil 14 attached to the blade 12.

The blade 12 extends along an axis of elongation X. The axis of elongation X of the blade 12 extends radially with respect to the longitudinal axis A of the turbine engine 1 after the vane 11 has been mounted on the turbine engine 1. The blade 12 has an aerodynamic profile. The blade 12 thus comprises a suction side face 12e and a pressure side face 12i connected by a leading edge 12a and a trailing edge 12b. The blade 12 thus extends along a transverse axis Y between the leading edge 12a and the trailing edge 12b. The transverse axis Y is perpendicular to the axis of elongation X. The blade 12 also extends longitudinally along the axis of elongation X between a first end and a second end opposite the first end.

The blade 12 is made of composite material. The composite material comprises a polymer matrix and a fibrous reinforcement embedded in the matrix. The composite material is, for example, an organic matrix composite (OMC). The matrix is, for example, a thermoplastic or thermosetting polymer matrix. The thermosetting material is, for example, an epoxy polymer. The fibrous reinforcement comprises fibres such as carbon fibres or glass fibres. The fibres are organised in the form of a fibrous preform.

Figure 4:
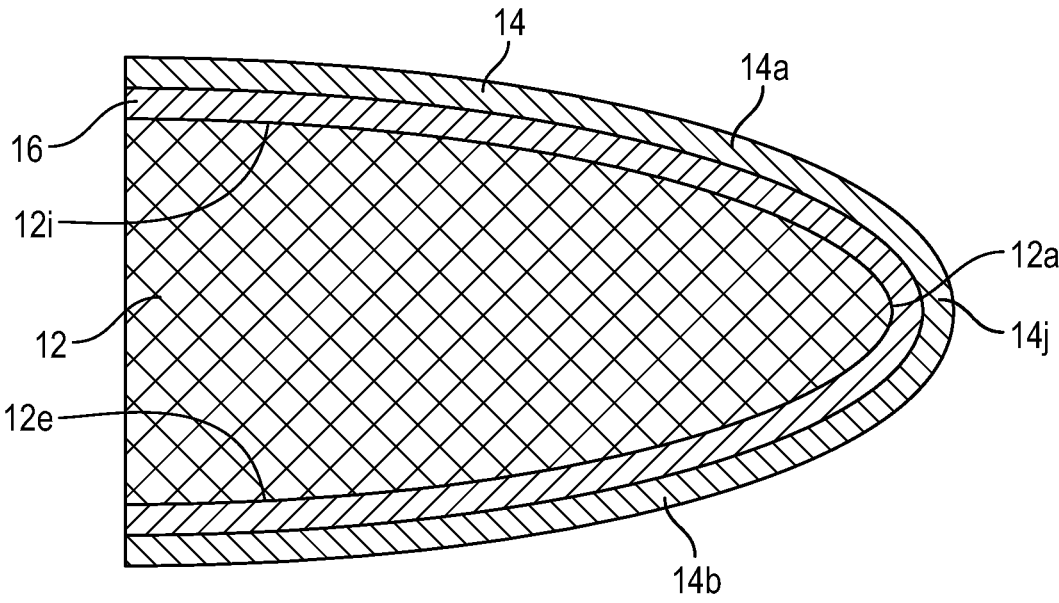
FIG. 4 is a cross-sectional view of the vane in FIG. 2 or 3.

The metallic foil 14 extends over the leading edge 12a and advantageously all along the leading edge 12a. The metallic material of the metal foil 14 is, for example, titanium or an alloy such as steel, for example stainless steel or a nickel-cobalt alloy (NiCo). The metal foil 14 has an elongated dihedral shape. It is designed to protect the leading edge 12a from external impacts. As can be seen in FIG. 4, the metal foil 14 has a V-shaped or U-shaped cross-section. The metal foil 14 comprises a first lateral fin 14a and a second lateral fin 14b connected to the first lateral fin 14a by a central portion 14j. The first and second lateral fins 14a, 14b define between them a cavity in which the leading edge 12a is arranged. The first lateral fin 14a has a first free longitudinal end and the second lateral fin 14b has a second free longitudinal end which are opposite the central portion 14j. The longitudinal ends extend respectively over the pressure side face 12i and the suction side face 12e of the blade 12. Each lateral fin 14a, 14b has a first edge and a second edge opposite the first edge along the axis of elongation X. The edges extend transversely with respect to the longitudinal ends. Advantageously, the thickness of the metal foil 14 is variable. For example, the thickness of the central portion 14j is greater than the thicknesses of the first and second lateral fins 14a, 14b. Advantageously, the thickness of the first and second lateral fins 14a, 14b decreases towards the trailing edge 12b of the blade 12. The first and second lateral fins 14a, 14b are tapered towards the trailing edge 12b of the blade 12.

The metal foil 14 is attached to the leading edge 12a by gluing. The vane 11 comprises at least one layer of glue 16 arranged between the blade 12 and the metal foil 14. An additional layer of adhesive (not shown) can also be arranged between the protective shield 14 and the blade 12 so as to improve the attachment of the protective shield 14.

In a first embodiment shown in FIG. 2, the vanes 11 are movable in rotation. For example, they are equipped to the fan 2, the low-pressure compressor 3 and/or the high-pressure compressor 4 and/or the high-pressure turbine and/or the low-pressure turbine. According to this first embodiment, the vane 11 also comprises a root 13. In particular, the root 13 is connected to the second end of the vane 11. It is designed to be attached to a disk (not shown) movable in rotation about the longitudinal axis A of the turbine engine 1, for example.

In a second embodiment shown in FIG. 3, the vanes 11 are equipped to the stator vane 10. Such vanes 11 equipping the stator vane 10 are known as Outlet Guide Vane (OGV). In this second embodiment, the vane 11 also comprises a first platform 120a and an opposite second platform 120b. The first platform 120a is secured to the first end of the vane 11 and the second platform 120b is secured to the second end of the vane 11.

The vane 11 is manufactured using a resin transfer moulding method known as RTM (Resin Transfer Moding).

Figure 9:
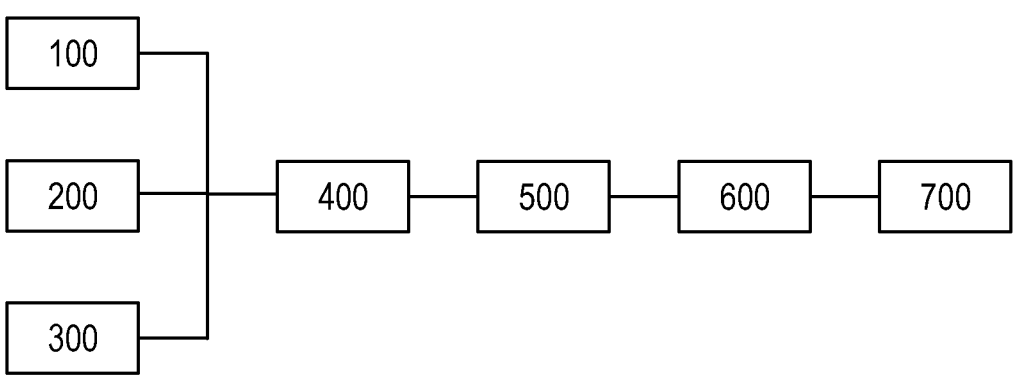
FIG. 9 is a block diagram of the manufacturing method according to the invention.

A method for manufacturing the vane 11 according to the invention will now be described with reference to FIG. 9.

Figure 5:
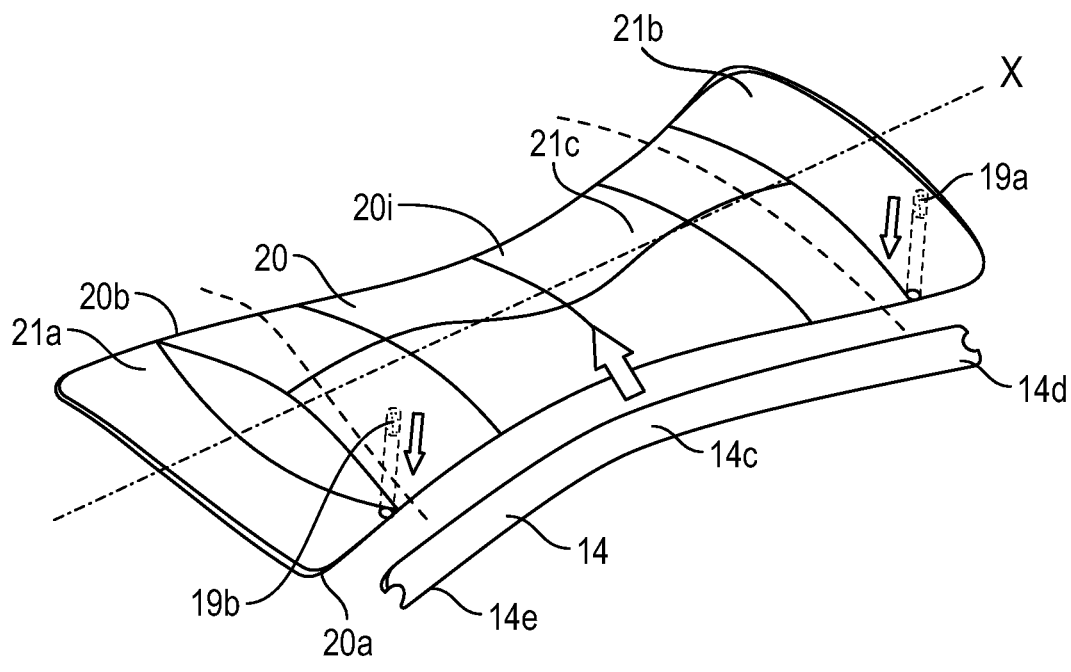
FIG. 5 is a schematic view of a fibrous preform and of a metal foil.

In a first step 100, a fibrous preform 20, shown for example in FIG. 5, is provided. The fibrous preform 20 forms the fibrous reinforcement of the composite material of the blade 12. The fibrous preform 20 comprises a three-dimensional weave of reinforcing fibres. As described above, the fibres are carbon fibres or glass fibres. The fibrous preform 20 has the same profile as the blade 12. The fibrous preform 20 thus extends along the axis of elongation X and has an aerodynamic profile. It has a leading edge 20a, a trailing edge 20b, a pressure side face 20i connected to a suction side face by the leading edge 20a and the trailing edge 20b.

According to an advantageous embodiment of the invention, the fibrous preform 20 comprises, along the axis X, a central part 21c and a first excess part 21a and a second excess part 21b arranged on either side of the central part 21c. The excess parts 21a and 21b, for example, are intended to be at least partially removed during a subsequent machining step. The excess parts 21a and 21b are located outside the dynamic part of the fibrous preform 20, i.e. outside the part of the blade 12 intended to come into contact with the primary or secondary flow F1, F2.

Figure 6:
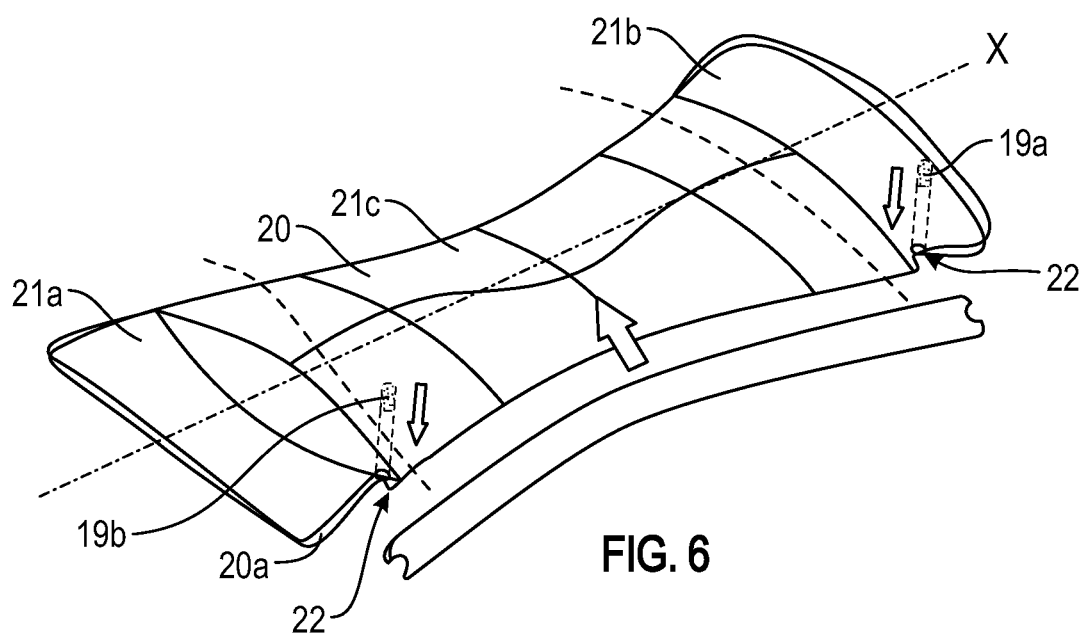
FIG. 6 is a schematic view of a fibrous preform and a metal foil according to a variant embodiment of FIG. 5.

Advantageously, and as illustrated in FIG. 6, the fibrous preform 20 comprises at least one additional indexing recess 22. The additional indexing recess 22 is produced by water jet cutting, for example. The additional indexing recess 22 is formed, for example, on the first part and/or the second excess part 21a, 21b. The additional indexing recess 22 is a notch, for example. According to an example not shown, the additional indexing recess 22 is an orifice. The orifice has an axis which extends perpendicular to the axis of elongation X of the fibrous preform 20. The orifice is preferably through-going. The additional indexing recess 22 is formed on the leading edge 20a of the fibrous preform 20. The fibrous preform 20 comprises, for example, an additional indexing recess 22 made on the first excess part 21a and an additional indexing recess 22 made on the second excess part 21b.

The method also comprises a step 200 of supplying the metal foil 14. Step 200 can be carried out before, after or simultaneously with step 100.

In step 200, the metal foil 14 comprises, in particular along the axis of elongation X, a central part 14c and a first excess part 14d and a second excess part 14e arranged on either side of the central part 14c. The excess parts 14d, 14e are intended to cover the excess parts 21b, 21a of the leading edge 20a of the fibrous preform 20.

Figure 7A:
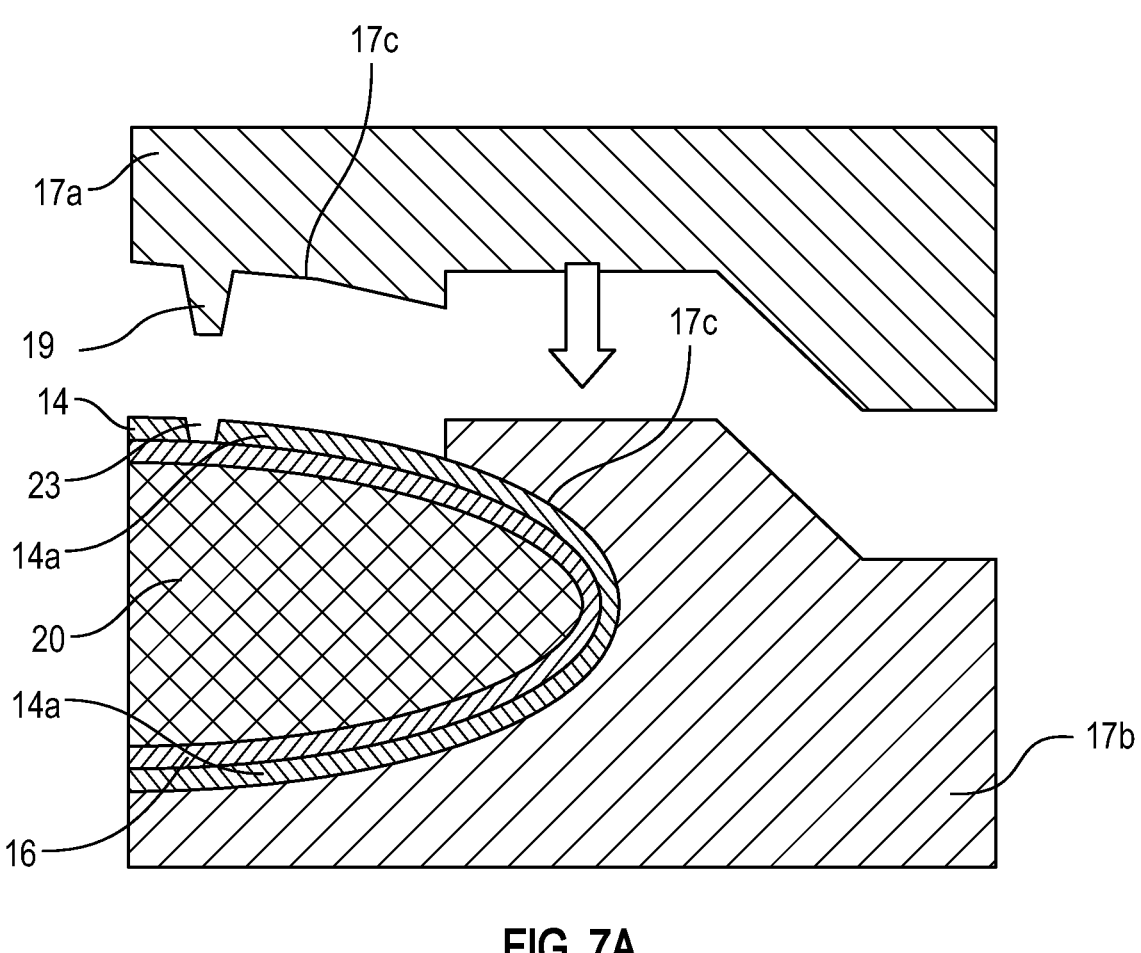
FIG. 7a is a cross-sectional view of a mould in an open position in which the fibrous preform and the metal foil are arranged.

According to the invention, in step 200, the metal foil 14 comprises at least one indexing recess 23 shown for example in FIG. 7a. The indexing recess 23 opens onto the surface opposite the fibrous preform 20. The indexing recess 23 is, for example, a notch or an orifice. The axis of the orifice is perpendicular to the longitudinal axis X of the fibrous preform 20. The indexing recess 23 is located on at least one excess part 14d, 14e or on each excess part 14d, 14e. Thus, the metal foil 14 may comprise a first indexing recess 23 such as an orifice and a second indexing recess 23 such as an orifice opposite the first indexing recess 23. The indexing recess 23 can be located on the first lateral fin 14a and/or the secondary lateral fin 14b as shown in FIG. 7c. The indexing recess 23 is formed, for example, throughout the thickness of the first lateral fin 14a and/or the second lateral fin 14b. The adhesive layer 16 is also arranged in the metal foil 14 in such a way that the adhesive layer 16 is arranged between the metal foil 14 and the fibrous preform 20 after the metal foil 14 has been arranged on the leading edge 20a. This glue layer 16 can also be formed in a subsequent injection step 600.

Figure 8:
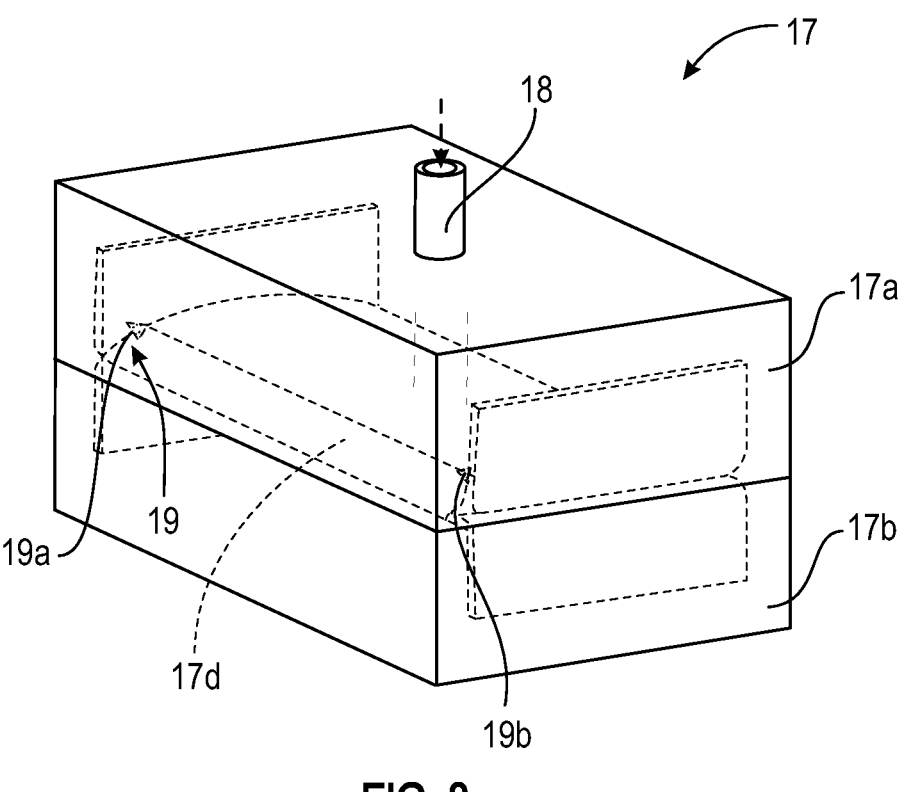

The method further comprises a step 300 of providing an injection mould 17. Step 300 can be carried out before, after or simultaneously with the above steps. The injection mould 17 is shown in FIG. 8, for example.

The injection mould 17 comprises at least an upper part 17a and a lower part 17b. The upper part 17a is mobile, for example, and the lower part 17b is stationary, for example. The injection mould 17 can thus be opened or closed by rotation or translation, for example of the upper part 17a.

The upper part 17a and the lower part 17b each comprise an internal face presenting an pattern 17c of the vane 11 to be produced. By "internal face" is meant the face which is inside the injection mould 17 when the latter is closed and which faces the internal face of the other part. When the mould 17 is closed, the pattern 17c of each of the upper and lower parts 17a, 17b define an internal volume 17d having the shape of the vane 11 to be produced and in which the fibrous preform 20 and the metal foil 14 are placed.

The injection mould 17 comprises a port 18 for injecting a resin. The injection port 18 is located, for example, on the upper part 17a.

Figure 7B:
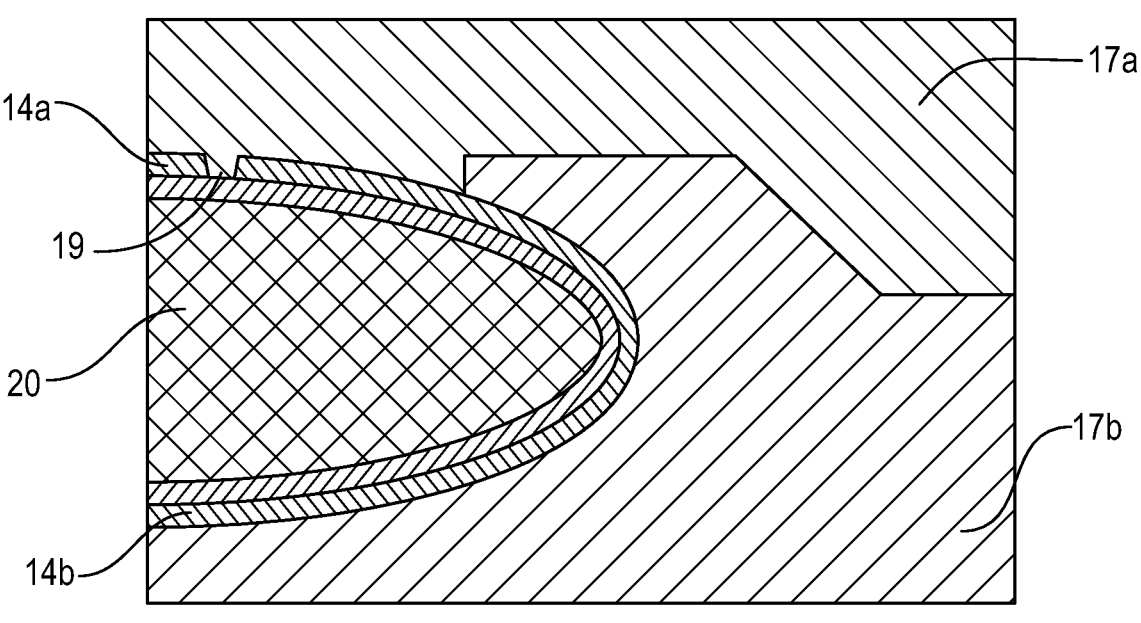
FIG. 7b is a cross-sectional view of the mould in a closed position, in which the fibrous preform and the metal foil are arranged.
Figures 7C, 7D:
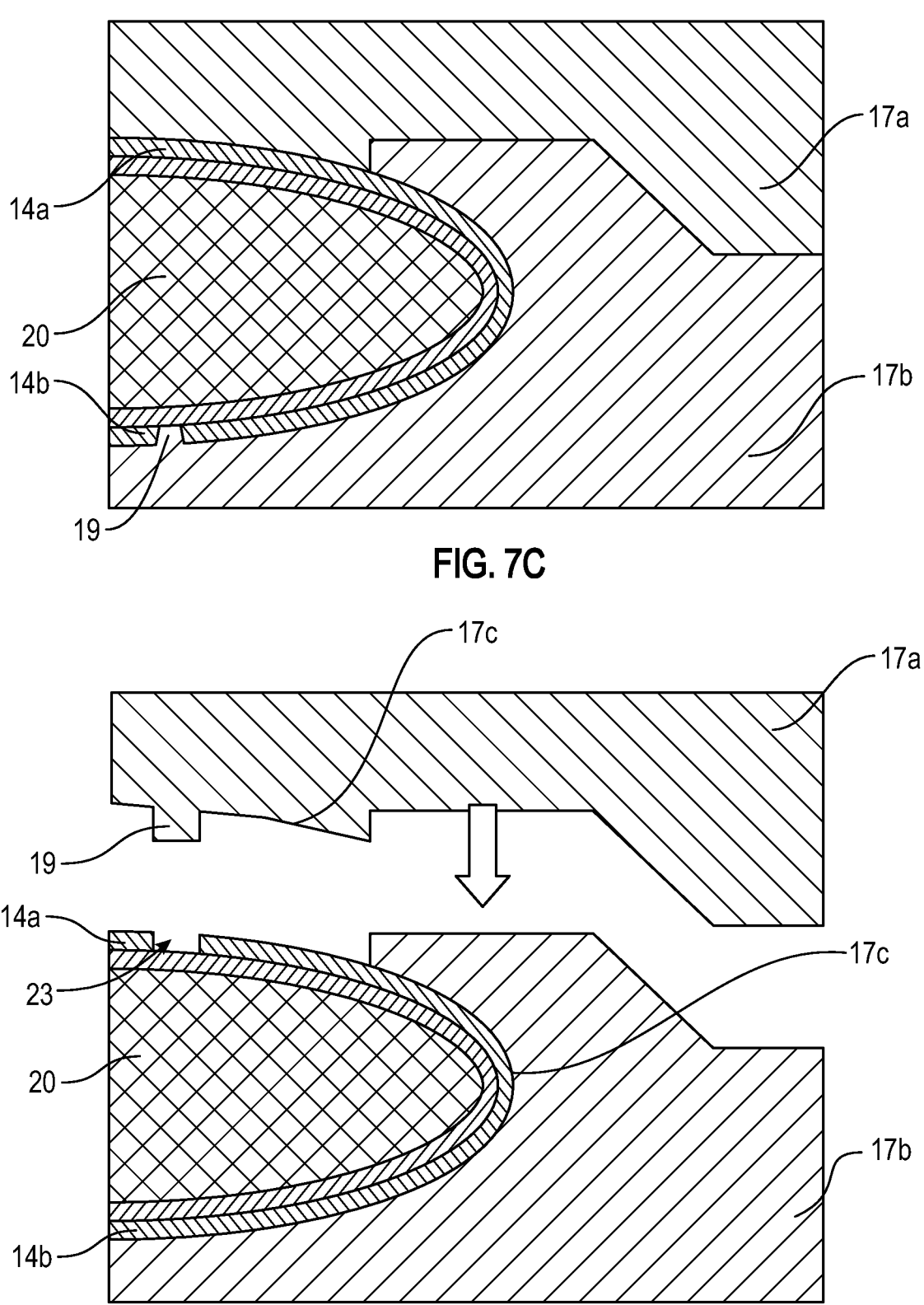
FIG. 7c is a cross-sectional view of the mould in a closed position and in which the fibrous preform and the metal foil are arranged, according to a variant embodiment of FIG. 7b.
FIG. 7d is a cross-sectional view of the mould in an open position and in which the fibrous preform and the metal foil are arranged, according to a variant embodiment of FIG. 7a, FIG. 8 is a schematic perspective view of the injection mould according to the invention.

As can be seen more clearly in FIGS. 7a to 7d, according to the invention, the injection mould 17 also comprises at least one projecting positioning element 19. The projecting positioning element 19 allows the metal foil 14 to be positioned and held in position on the leading edge 20a in the injection mould 17 during the injection of the resin. The projecting positioning element 19 has a complementary shape to the indexing recess 23. The projecting positioning element 19 is, for example, a nipple with a cylindrical shape as shown in FIG. 7d or a conical shape as shown in FIGS. 7a to 7c. Advantageously, the nipple has a threaded external surface. This makes it easier for the nipple to engage with the metal foil 14. Advantageously, the projecting positioning element 19 is removable. "Removable" means that the projecting positioning element 19 can be added to or removed from the injection mould 17 without damaging the injection mould 17. The projecting positioning element 19 wears out during the injection cycles and the projecting positioning element 19 needs to be replaced. The removable nature of the projecting positioning element 19 therefore facilitates the maintenance of the injection mould 17. Alternatively, the projecting positioning element 19 is permanently mounted in the injection mould 17. For example, it is machined or welded to the injection mould 17.

According to an example of embodiment shown in FIGS. 7a and 7b, the projecting positioning element 19 is located on the upper part 17a of the injection mould 17. According to another example of embodiment shown in FIG. 7c, the projecting positioning element 19 is located on the lower part 17b of the injection mould 17.

Advantageously, the injection mould 17 comprises a first projecting positioning element 19a and a second projecting positioning element 19b. The projecting positioning elements 19a, 19b are located, for example, at the ends of the lower 17b and/or upper 17a parts.

The projecting positioning element 19b is located on the inner surface of the lower and/or upper parts 17b, 17a. The inner surface is the surface facing the fibrous preform 20 after insertion into the injection mould 17.

Then, in a step subsequent to the above steps, the method comprises a step 400 of arranging the fibrous preform 20 in the injection mould 17 with a view to impregnating the fibrous preform 20.

The method according to the invention further comprises a subsequent step 500 during which the leading edge 20a of the fibrous preform 20 is coated with the metal foil 14. The indexing recess 23 and the additional indexing recess 22 are aligned during this step, allowing the metal foil 14 to be positioned accurately.

During this step, the projecting positioning element 19 is inserted into the indexing recess 23 and the additional indexing recess 22. This can take place when the injection mould 17 is closed, as shown in FIG. 7b, when the projecting positioning element 19 is arranged on the upper part 17a, which is the movable part of the injection mould 17, or as soon as the fibrous preform 20 is inserted, as shown in FIG. 7c, when the projecting positioning element 19 is arranged on the lower part 17b, which is the stationary part of the injection mould 17. In this way, the cooperation of the projecting positioning element 19 and of the indexing recess 23 allows the fibrous preform 20 and the metal foil 14 to be precisely positioned in the injection mould 17.

A step 600 of injecting the resin into the mould is then carried out via the injection port 18. This step allows the fibrous preform 20 to be impregnated and the metal foil 14 to be attached to the leading edge 12a. During the injection step, the metal foil 14 is held in position on the leading edge 12 by the cooperation of the projecting positioning element 19 and of the indexing recess 23. The resin is the material that forms the matrix of the blade 12. The temperature of the injection mould 17 during the injection step is between 50° C. and 200° C., advantageously between 50° C. and 180° C.

Optionally, depending on the resin material, a curing sub-step 610 may be carried out to polymerise the glue layer 16 and the resin. The curing step is carried out at a temperature of between 120° C. and 250° C.

Advantageously, after step 600, the method comprises a step 700 of machining the vane 11 so as to remove the indexing recess 23 and the additional indexing recess 22 where present. In this step, the vane 11 is machined so as to at least partially remove the excess parts 21a, 21b, 14d, 14e. The indexing recesses 23, 22 are thus made in the offcuts of the vane 11 and have no impact on the properties of the vane 11.

In addition, the indexing recess 22 in the fibrous preform 20 facilitates pairing with the projecting positioning element 19. This also allows to reduce the local deformations in the weaving of the fibrous preform 20 when the projecting positioning element 19 is inserted into the indexing recess 23 of the metal foil 14. The fibrous preform 20 is also positioned more accurately relative to the leading edge 12a.

The invention claimed is:

1. A method for manufacturing a vane comprising a blade for an aircraft turbine engine, the method comprising the following steps:
   providing a fibrous preform of the blade, the fibrous preform comprising a leading edge, a trailing edge, and a pressure side face connected to a suction side face by the leading edge and the trailing edge,
   providing an elongate metal foil comprising at least one indexing recess,
   providing an injection mold comprising at least upper and lower parts configured to cooperate to delimit an internal volume and each defining a pattern of the vane, and at least one of these upper and lower parts comprising at least one projecting positioning element,
   arranging the fibrous preform in the injection mold,
   coating the leading edge of the fibrous preform with the metal foil, and inserting the projecting positioning element into the indexing recess so as to hold the metal foil in position on the leading edge, and
   injecting a resin into the injection mold in order to impregnate the fibrous preform and to attach the metal foil to the leading edge.

2. The manufacturing method according to claim 1, wherein the projecting positioning element is a nipple provided on an inner surface of the upper part or of the lower part.

3. The manufacturing method according to claim 2, wherein the nipple has a cylindrical or conical shape.

4. The manufacturing method according to claim 2, wherein the nipple has a threaded external surface.

5. The manufacturing method according to claim 1, wherein the metal foil comprises a first lateral fin and a second lateral fin connected to the first lateral fin by a central portion, the indexing recess being provided on the first or the second lateral fin.

6. The manufacturing method according to claim 1, wherein the metal foil comprises a central part and an excess part arranged on either side of the central part, the indexing recess being located on one or each of the excess parts.

7. The manufacturing method according to claim 1, wherein the indexing recess is an orifice or a notch.

8. The manufacturing method according to claim 1, wherein the metal foil comprises two indexing recesses respectively comprising a first orifice and a second orifice opposite the first orifice and in that, the upper or lower part comprising a first projecting positioning element configured to cooperate with the first orifice and a second projecting positioning element configured to cooperate with the second orifice.

9. The manufacturing method according to claim 1, wherein the fibrous preform comprises an additional indexing recess.

10. The manufacturing method according to claim 1, further comprising, after the step of injecting a resin into the injection mold, the step of:

machining the vane to remove the indexing recess.

\* \* \* \* \*